(12) United States Patent
Sugae et al.

(10) Patent No.: US 11,511,805 B2
(45) Date of Patent: Nov. 29, 2022

(54) VEHICLE GUIDANCE DEVICE, METHOD, AND COMPUTER PROGRAM PRODUCT

(71) Applicant: AISIN CORPORATION, Kariya (JP)

(72) Inventors: Ippei Sugae, Aichi-ken (JP); Kiyokazu Ieda, Kariya (JP)

(73) Assignee: AISIN CORPORATION, Kariya (JP)

( * ) Notice: Subject to any disclaimer, the term of this patent is extended or adjusted under 35 U.S.C. 154(b) by 561 days.

(21) Appl. No.: 16/496,575

(22) PCT Filed: Feb. 28, 2018

(86) PCT No.: PCT/JP2018/007641
§ 371 (c)(1),
(2) Date: Sep. 23, 2019

(87) PCT Pub. No.: WO2018/180160
PCT Pub. Date: Oct. 4, 2018

(65) Prior Publication Data
US 2020/0317268 A1    Oct. 8, 2020

(30) Foreign Application Priority Data

Mar. 29, 2017    (JP) .............................. JP2017-065888

(51) Int. Cl.
*B62D 15/02*    (2006.01)
*G01S 7/521*    (2006.01)
(Continued)

(52) U.S. Cl.
CPC ....... *B62D 15/0285* (2013.01); *B62D 15/028* (2013.01); *G01S 7/521* (2013.01);
(Continued)

(58) Field of Classification Search
CPC ... B62D 15/0285; B62D 15/028; G01S 7/521; G01S 15/08; G01S 15/931;
(Continued)

(56) References Cited

U.S. PATENT DOCUMENTS 6,671,592 B1    12/2003    Bisset et al.
2009/0279389 A1*    11/2009    Irie .......................... G01S 7/003
367/118
(Continued)

FOREIGN PATENT DOCUMENTS

JP    2004-220197 A    8/2004
JP    2010-039870 A    2/2010
(Continued)

OTHER PUBLICATIONS

International Search Report for PCT/JP2018/007641 dated May 15, 2018 (PCT/ISA/210).

*Primary Examiner* — Marthe Y Marc-Coleman
(74) *Attorney, Agent, or Firm* — Sughrue Mion, PLLC

(57) ABSTRACT

According to one embodiment, a vehicle guidance device is to be installed in a vehicle for providing path guidance to the vehicle. The device includes a plurality of receivers that receives a ranging information signal via a ultrasonic-wave ranging sensor, the ranging information signal including an ultrasonic-wave ranging signal on which path guidance information is superimposed, the ultrasonic-wave ranging signal being for measuring a distance to an object; an information extractor that extracts, for each of the receivers, the path guidance information from the ranging information signal; and a path guide that provides the path guidance on the basis of a distance corresponding to the ultrasonic-wave ranging signal and the path guidance information.

10 Claims, 13 Drawing Sheets

(51) Int. Cl.
*G01S 15/08* (2006.01)
*G01S 15/931* (2020.01)
*G05D 1/02* (2020.01)

(52) U.S. Cl.
CPC ............ *G01S 15/08* (2013.01); *G01S 15/931* (2013.01); *G05D 1/0212* (2013.01); *G05D 1/0255* (2013.01); *G01S 2015/932* (2013.01)

(58) Field of Classification Search
CPC . G01S 2015/932; G01S 15/86; G05D 1/0255; B60R 99/00; G08G 1/14
See application file for complete search history.

(56) References Cited

U.S. PATENT DOCUMENTS

2010/0042319 A1* 2/2010 Wu ...................... G05D 1/0255
701/408
2014/0357213 A1 12/2014 Tanaka et al.
2016/0280263 A1 9/2016 Mori

FOREIGN PATENT DOCUMENTS

| | | | |
|---|---|---|---|
| JP | 2010039870 A | * | 2/2010 |
| JP | 2010-188744 A | | 9/2010 |
| JP | 2011-054116 A | | 3/2011 |
| JP | 2011054116 A | * | 3/2011 |
| JP | 2014-137743 A | | 7/2014 |
| JP | 2014137743 A | * | 7/2014 |
| JP | 2014-232411 A | | 12/2014 |
| JP | 2016-175620 A | | 10/2016 |
| JP | 2016-213551 A | | 12/2016 |
| JP | 2016213551 A | * | 12/2016 |
| KR | 1043044 B1 | * | 6/2011 |

\* cited by examiner

VEHICLE GUIDANCE DEVICE, METHOD, AND COMPUTER PROGRAM PRODUCT

CROSS-REFERENCE TO RELATED APPLICATIONS

This application is national stage application of International Application No. PCT/JP2018/007641, filed Feb. 28, 2018, which designates the United States, incorporated herein by reference, and which claims the benefit of priority from Japanese Patent Application No. 2017-065888, filed Mar. 29, 2017, the entire contents of which are incorporated herein by reference.

TECHNICAL FIELD

Embodiments of the present invention relate generally to a vehicle guidance device, method, and computer program product.

BACKGROUND ART

Examples of driver-assistance technology during a vehicle running include informing the driver of an obstacle around the vehicle by detecting the obstacle with a plurality of ultrasonic sensor devices (sonars) installed in the vehicle; and informing the driver of an obstacle around the vehicle by detecting the obstacle from image data of surrounding environment from an imaging device (camera).

As a development of such technology, a parking assist device is proposed, for example, which stores an image of a parking position in a parking lot as a reference image, detects correlation between the reference image and an image of the surrounding environment from an imaging device (camera), and provides guiding information for the vehicle by voice on the basis of a result of the detection (see, for example, Patent Literature 1).

CITATION LIST

Patent Literature

Patent Document 1: Japanese Laid-open Patent Application Publication No. 2010-188744

SUMMARY OF INVENTION

Problem to be Solved by the Invention

However, there may be an obstacle not included in the reference image or the vehicle travels during nighttime. In such a case, the amount of available information from the image is decreased, which makes it difficult to detect the correlation and guide the vehicle.

Thus, there are demands for developing a vehicle guidance device, method, and computer program of a simple configuration that can ensure collecting of information to guide the vehicle.

Means for Solving Problem

In view of solving the above problem, according to one embodiment, a vehicle guidance device is to be installed in a vehicle for providing path guidance to the vehicle. The device includes a plurality of receivers that receives a ranging information signal via a ultrasonic-wave ranging sensor, the ranging information signal including an ultrasonic-wave ranging signal on which path guidance information is superimposed, the ultrasonic-wave ranging signal being for measuring a distance to an object; an information extractor that extracts, for each of the receivers, the path guidance information from the ranging information signal; and a path guide that provides the path guidance on the basis of a distance corresponding to the ultrasonic-wave ranging signal and the path guidance information.

The vehicle guidance device as configured above receives and extracts the path guidance information via the ultrasonic-wave ranging sensor used for obstacle detection, to provide the path guidance on the basis of the distance corresponding to the ultrasonic-wave ranging signal and the path guidance information. Thereby, the vehicle guidance device can ensure collecting of information to guide the vehicle.

According to the vehicle guidance device of an embodiment, the path guidance information includes identification information for identifying a transmitter that has transmitted the ranging information signal. The path guide may calculate a position and an orientation of the vehicle from the identification information and location information of the receivers, to provide the path guidance.

The vehicle guidance device as configured above can ensure calculation of the position and the orientation of the vehicle and provide more detailed, accurate path guidance.

According to the vehicle guidance device of an embodiment, the path guide may acquire and store, in advance, location information of the transmitter associated with the identification information to provide the path guidance on the basis of the location information of the transmitter.

The vehicle guidance device as configured above can understand the entire path in a situation that the path guidance is provided for the first time, and can provide reliable path guidance.

According to the vehicle guidance device of an embodiment, upon entry of the vehicle into in a region in which the path guidance is provided, one or more of the receivers may receive the location information of the transmitter as the ranging information signal from the transmitter located in the region.

The vehicle guidance device as configured above can understand the entire path in an unfamiliar area (district, facility, and so on) in which the path guidance is provided for the first time, and can provide reliable path guidance.

According to the vehicle guidance device of an embodiment, the path guidance information includes expected running-path information of the vehicle. The path guide may include an information presenter that presents, on the basis of the expected running-path information, a driver with information for guiding the vehicle along an expected running path corresponding to the expected running path information.

The vehicle guidance device as configured above makes it possible for the driver to drive the vehicle equipped with no automatic driving system to a desired location in accordance with the vehicle guide information.

According to the vehicle guidance device of an embodiment, the path guide may include a steering control that calculates a difference between the expected running path and an actual running path of the vehicle, and, when the difference between the expected running path and the actual running path is equal to or greater than a given value, controls a steering angle of a wheel of the vehicle to decrease the difference to below the given value.

The vehicle guidance device as configured above can cause the steering control to maneuver and guide the vehicle to a desired location on the basis of the vehicle guide information.

According to the vehicle guidance device of an embodiment, the path guide may include a steering information presenter that calculates a difference between the expected running path and an actual running path of the vehicle, and, when the difference between the expected running guidance path and the actual running path is equal to or greater than a given value, provides steering information of the vehicle to decrease the difference to below the given value.

The vehicle guidance device as configured above enables the driver to travel to a desired location along the guidance path by simply maneuvering the vehicle in accordance with the vehicle steering information provided by the steering information presenter.

According to the vehicle guidance device of an embodiment, the path guidance information includes guiding information to a parking space and information on a parking-end position. The vehicle may include, as an operation mode, an automatic parking mode to perform automatic parking. Upon detection of the vehicle having reached the vicinity of the parking space, the path guide may transition to the automatic parking mode to control the vehicle to reach the parking-end position in accordance with the path guidance information.

The vehicle guidance device as configured above enables the vehicle to transition to the automatic parking mode to reach the parking-end position in accordance with the path guidance information.

A method of an embodiment is to be executed by a vehicle guidance device to be installed in a vehicle to provide path guidance to the vehicle. The method includes receiving, by a plurality of receivers, a ranging information signal via a ultrasonic-wave ranging sensor, the ranging information signal including an ultrasonic-wave ranging signal on which path guidance information is superimposed, the ultrasonic-wave ranging signal being for measuring a distance to an object; extracting, for each of the receivers, the path guidance information from the ranging information signal; and providing the path guidance on the basis of a distance corresponding to the ultrasonic-wave ranging signal and the path guidance information.

The method as configured above can receive and extract the path guidance information via the ultrasonic-wave ranging sensor used for obstacle detection to provide the path guidance on the basis of the distance corresponding to the ultrasonic-wave ranging signal and the path guidance information, which can ensure collecting of information to guide the vehicle.

A computer program product of an embodiment including programmed instructions embodied in and stored on a non-transitory computer readable medium, wherein the instructions, when executed by a computer, cause a computer to control a vehicle guidance device installed in a vehicle, the device that comprises a plurality of receivers and provides path guidance to the vehicle, the receivers that receive a ranging information signal via a ultrasonic-wave ranging sensor, the ranging information signal including an ultrasonic-wave ranging signal on which path guidance information is superimposed, the ultrasonic-wave ranging signal being for measuring a distance to an object. The instructions cause the computer to perform extracting, for each of the receivers, the path guidance information from the ranging information signal; and providing the path guidance on the basis of a distance corresponding to the ultrasonic-wave ranging signal and the path guidance information.

The computer program product as configured above can cause the computer to receive and extract the path guidance information via the ultrasonic-wave ranging sensor used for obstacle detection to provide the path guidance on the basis of the distance corresponding to the ultrasonic-wave ranging signal and the path guidance information, which can ensure collecting of information to guide the vehicle.

DESCRIPTION OF EMBODIMENTS

The following discloses exemplary embodiments of the present invention. Configurations of the following embodiments and operation, results, and effects achieved by the configurations are merely illustrative. The present invention is implementable by configurations other than the configurations disclosed below and can attain at least one of various effects and derivative effects based on a basic configuration.

A vehicle 1 (see FIG. 1) of the present embodiment may, for example, be an automobile including an internal combustion engine (not illustrated) as a drive source, that is, an internal combustion engine automobile, an automobile including an electric motor (not illustrated) as a drive source, that is, an electric automobile or a fuel cell automobile, a hybrid automobile including both as drive sources, or an automobile including any other drive source.

In addition, the vehicle 1 may incorporate various transmissions, or various devices such as systems or parts or components required for driving the internal combustion engine or the electric motor. Systems, numbers, and layout of devices involving with driving of wheels 3 of the vehicle 1 can be set variously.

Figure 1:
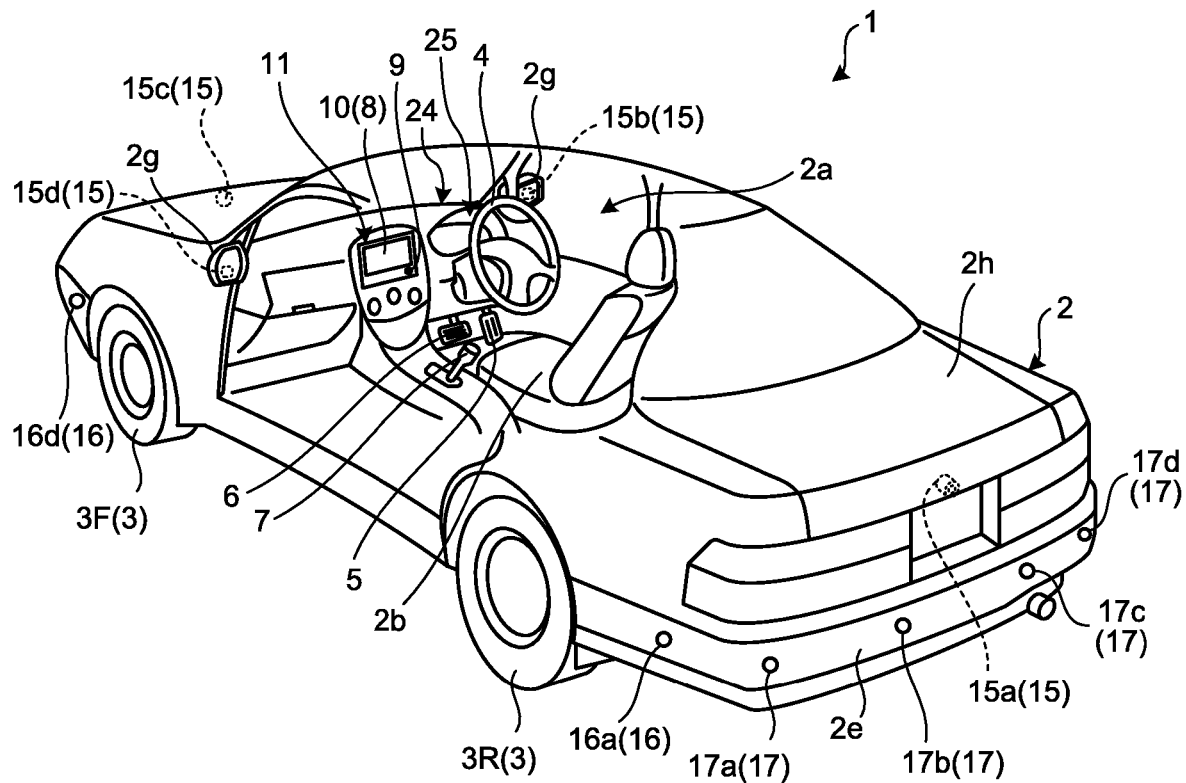
FIG. 1 is an illustrative perspective view of an interior of a vehicle partially transparent according to an embodiment is.

FIG. 1 is an illustrative perspective view of the vehicle interior partially transparent in the embodiment.

Figure 2:
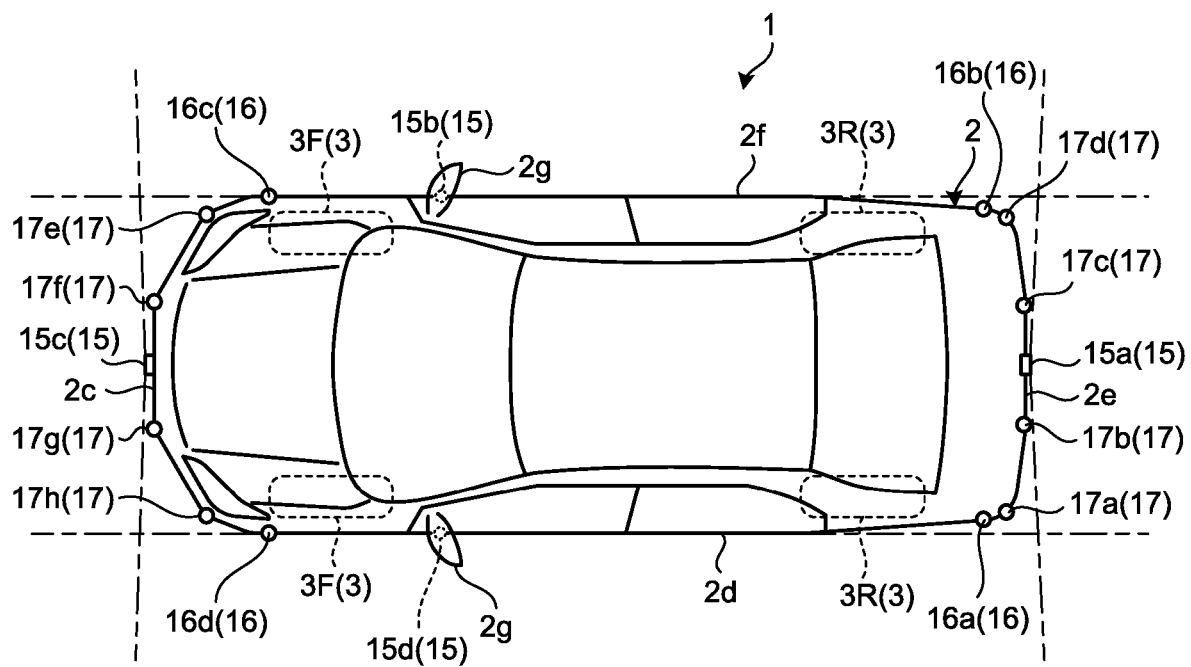
FIG. 2 is an illustrative plan view (bird's eye view) of the vehicle in the embodiment.

FIG. 2 is an illustrative plan view (bird's eye view) of the vehicle in the embodiment.

As illustrated in FIG. 1, a vehicle body 2 of the vehicle 1 defines a vehicle interior 2a in which occupants (not illustrated) ride. A steering 4, an acceleration operator 5, a brake operator 6, and a transmission operator 7 are placed inside the vehicle interior 2a, facing a seat 2b of a driver as the occupant.

The steering 4 is, for example, a steering wheel that protrudes from a dashboard 24.

The acceleration operator 5 is, for example, an accelerator pedal located at a driver's foot.

The brake operator 6 is, for example, a brake pedal located at the driver's foot.

The transmission operator 7 is, for example, a shift lever that protrudes from a center console.

The steering 4, the acceleration operator 5, the brake operator 6, and the transmission operator 7 are not limited to such examples.

A display device 8 as a display output, and an audio output device 9 as an audio output are placed in the vehicle interior 2a. The display device 8 is, for example, a liquid crystal display (LCD) or an organic electroluminescent display (OELD). The audio output device 9 is, for example, a speaker. The display device 8 is covered with a transparent operation input 10, such as a touch panel. The occupant can view an image displayed on the screen of the display device 8 through the operation input 10.

For operational inputs, the occupant can touch, push, or move the operation input 10 at a position corresponding to the image displayed on the screen of the display device 8 with his or her finger, for example. The display device 8, the audio output device 9, and the operation input 10 are included in a monitor device 11 located at a vehicle-width center, i.e., a horizontal center of the dashboard 2. The monitor device 11 can include an operation input (not illustrated), such as a switch, a dial, a joystick, and a pushbutton.

Another audio output device (not illustrated) may be disposed at any location in the vehicle interior 2a, other than the monitor device 11, or the audio output device 9 of the monitor device 11 and another audio output device may output audio. The monitor device 11 may double as, for example, a navigation system and an audio system.

A display device 12 including an indicator LED, different from the display device 8, is also placed in the vehicle interior 2a.

Figure 3:
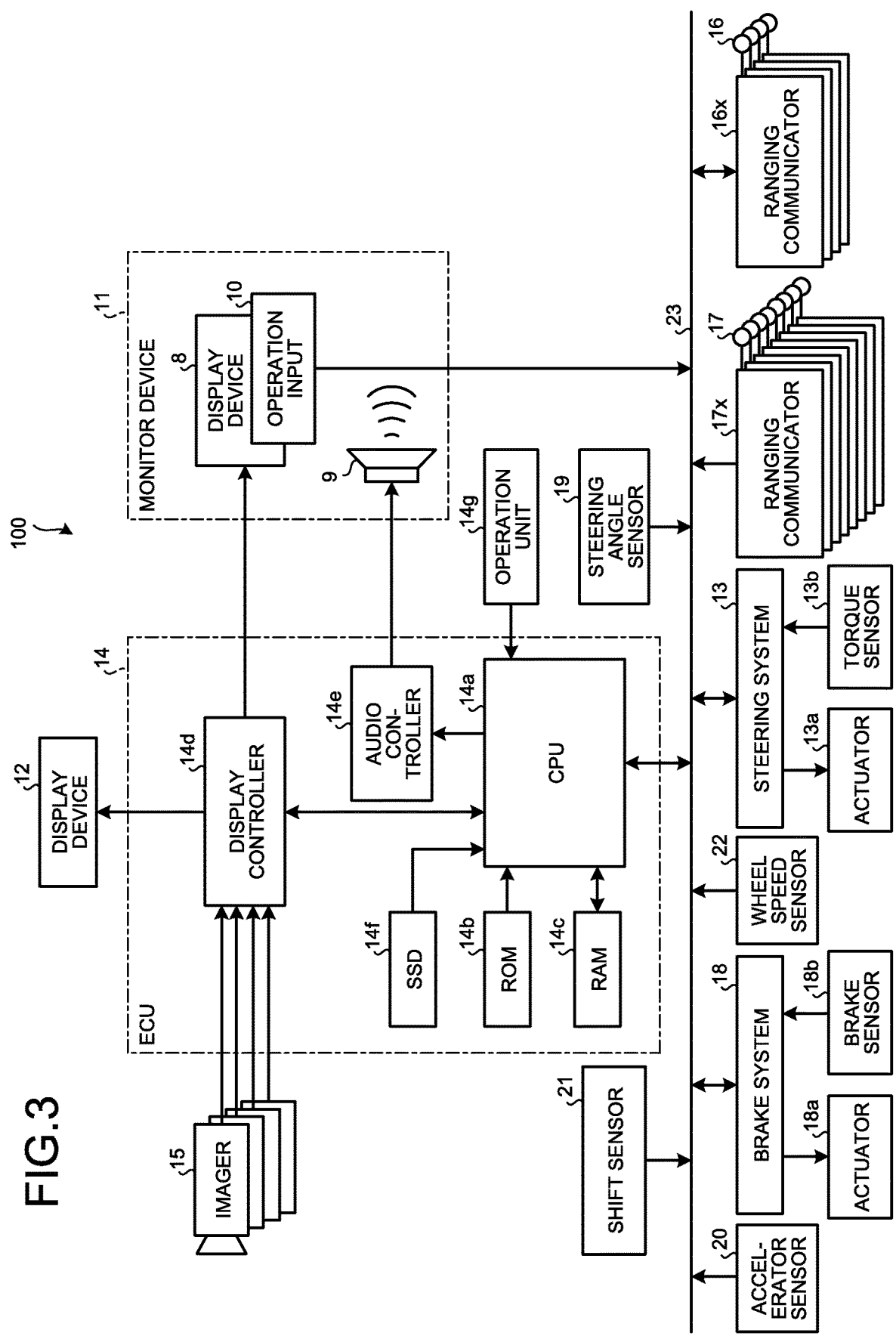
FIG. 3 is an illustrative block diagram of a configuration of a parking assist system in the embodiment.

FIG. 3 is an illustrative block diagram of a configuration of a parking assist system in the embodiment.

As illustrated in FIG. 3, the vehicle 1 includes a steering system 13 which steers at least two wheels (front wheels 3F and rear wheels 3R) 3. The steering system 13 includes an actuator 13a and a torque sensor 13b. The steering system 13 is electrically controlled by, for example, an electronic control unit (ECU) 14 to thereby operate the actuator 13a. The steering system 13 is configured as, for example, an electric power steering system or a steer-by-wire (SBW) system. The steering system 13 uses the actuator 13a to add torque, i.e., assist torque, to the steering 4 for aiding a steering force or uses the actuator 13a to steer the wheels 3. In this case, the actuator 13a may steer one wheel 3 or two or more wheels 3. The torque sensor 13b detects, for example, torque applied by the driver to the steering 4.

As illustrated in FIG. 2, the vehicle body 2 is provided with, for example, four imagers 15a to 15d, as a plurality of imagers 15. The imagers 15 are, for example, digital cameras that incorporate an image sensor, such as a charge coupled device (CCD) or a CMOS image sensor (CIS). The imagers 15 can output moving image data at a given frame rate. The imagers 15 each include a wide-angle lens or a fisheye lens and can image a horizontal range of, for example, 140 degrees to 190 degrees. The imagers 15 have an obliquely downward optical axis. Thus, the imagers 15 sequentially generate images of an ambient environment around the vehicle body 2 including a road surface on which the vehicle 1 is movable and a parkable area of the vehicle 1, and output image data.

The imager 15a is located, for example, at a rear end 2e of the vehicle body 2 on a wall below a door 2h of a rear trunk. The imager 15b is located at a right end 2f of the vehicle body 2, for example, on a right-side side mirror 2g. The imager 15c is located, for example, on the front side of the vehicle body 2, i.e., at a front end 2c in a vehicle lengthwise direction, for example, at a front bumper. The imager 15d is located, for example, on the left side of the vehicle body 2, i.e., on a left end 2d in the vehicle width direction at a side mirror 2g being a left-side protrusion.

As a result, the ECU 14 performs computation and image processing to the image data generated by the imagers 15 to be able to generate an image with a wider viewing angle and a virtual bird's eye view image of the vehicle 1 viewed from above. The bird's eye view image may be referred to also as a planar image.

The ECU 14 also identifies from the images of the imagers 15 partition lines drawn on the road surface around the vehicle 1 to thereby detect (extract) a parking section indicated by the partition lines.

As illustrated in FIGS. 1 and 2, the vehicle body 2 is provided with, for example, four ranging sensors 16a to 16d and eight ranging sensors 17a to 17h, as a plurality of ranging sensors 16 and 17. The ranging sensors 16 and 17 are, for example, sonars that emit ultrasonic waves and detect reflected waves thereof. The sonar may be referred to as a sonar sensor or an ultrasonic wave detector. The ranging sensors 16 and 17 are an exemplary detector that detects an object. The ranging sensors 17 may be used in detecting, for example, an object in a relatively short distance and the ranging sensors 16 may be used in detecting, for example, an object in a relatively longer distance than the ranging sensors 17. The ranging sensors 17 may be used in detecting, for example, an object ahead and behind the vehicle 1 and the ranging sensors 16 may be used in detecting an object lateral to the vehicle 1.

The ranging sensors 16 are connected to ranging communicators 16X, respectively. The ranging communicators 16X determine, from detection outputs from the ranging sensors 16, presence or absence of an object such as an obstacle located around the vehicle 1 and measures a distance to the object. The ranging communicators 16X also communicate with an outside via the ranging sensors 16.

Similarly, the ranging sensors 17 are connected to ranging communicators 17X, respectively. The ranging communicators 17X determine, from detection outputs from the ranging sensors 17, presence of an object such as an obstacle located around the vehicle 1 and measures a distance to the object. The ranging communicators 17X also communication with an outside via the ranging sensors 17.

Configurations of the ranging communicator 16X and the ranging communicator 17X will be detailed later.

As a result, the ECU 14 can determine whether there is an obstacle or other objects around the vehicle 1 and acquire the distance to the object from the results of measurement by the ranging communicators 16X and 17X. The ECU 14 can communicate with an external ranging communicator installed in, for example, a parking lot.

As illustrated in FIG. 3, in the parking assist system 100, a brake system 18, a steering angle sensor 19, an accelerator sensor 20, a shift sensor 21, a wheel speed sensor 22, and other elements are electrically connected to one another via an intra-vehicle network 23 being an electric communication line, in addition to the ECU 14, the monitor device 11, the steering system 13, the ranging sensors 16 and 17, and the ranging communicators 16X and 17X.

The intra-vehicle network 23 is configured as, for example, a controller area network (CAN). The intra-vehicle network 23 may be configured as a local interconnect network (LIN) or another network. The ranging sensors 16 and 17 may be connected directly to the ECU 14 via the LIN.

As a result, the ECU 14 can transmit a control signal over the intra-vehicle network 23 to control the steering system 13 and the brake system 18. The ECU 14 can also receive, via the intra-vehicle network 23, results of detection by, for example, the torque sensor 13b, a brake sensor 18b, the steering angle sensor 19, the ranging communicators 16X, the ranging communicators 17X, the accelerator sensor 20, the shift sensor 21, and the wheel speed sensor 22, and operation signals of the operation input 10.

The ECU 14 includes, for example, a central processing unit (CPU) 14a, a read only memory (ROM) 14b, a random access memory (RAM) 14c, a display controller 14d, an audio controller 14e, a solid state drive (SSD) 14f (flash memory), and an operation unit 14g to which commands to the ECU 14 are input.

The CPU 14a can perform various computations and control, including image processing to images displayed on the display devices 8 and 12, determination of a target moving position of the vehicle 1, calculation of a moving path of the vehicle 1, determination on interference or no interference with an object, and activation and deactivation of automatic control over the vehicle 1.

The CPU 14a can load an installed program from a nonvolatile storage device, such as the ROM 14b, and perform computation in accordance with the program. The RAM 14c temporarily stores various types of data used in the calculation by the CPU 14a.

Among the computation by the ECU 14, the display controller 14d mainly performs image processing to the image data generated by the imagers 15, and image composition of the image data to display on the display device 8. The audio controller 14e mainly processes audio data to output from the audio output device 9, among the computation by the ECU 14.

The SSD 14f is a rewritable nonvolatile storage and can store data at power-off of the ECU 14. The CPU 14a, the ROM 14b, the RAM 14c, and other parts can be integrated into a single package.

The ECU 14 may include, instead of the CPU 14a, a digital signal processor (DSP) or another logic operation processor, and a logic circuit. Alternatively, the ECU 14 may include a hard disk drive (HDD) instead of the SSD 14f, or the SSD 14f or the HDD may be separated from the ECU 14.

The brake system 18 is configured as, for example, an anti-lock brake system (ABS) that prevents the brake from locking, an electronic stability control (ESC) that prevents the vehicle 1 from skidding during cornering, an electric brake system that boosts a braking force (performs brake assist), or a brake-by-wire (BBW).

The brake system 18 applies a braking force to the wheels 3 and the vehicle 1 via an actuator 18a. The brake system 18 can perform various types of control by detecting brake lockup, idling of the wheels 3, and an indication of skidding from a difference in rotational speed between the left and right wheels 3.

The brake sensor 18b is, for example, a sensor that detects the position of a movable part of the brake operator 6. The brake sensor 18b can detect the position of the brake pedal as the movable part of the brake operator 6. The brake sensor 18b includes a displacement sensor.

The steering angle sensor 19 is, for example, a sensor that detects a steering amount of the steering 4, such as a steering wheel. The steering angle sensor 19 includes, for example, a Hall element. The ECU 14 acquires, from the steering angle sensor 19, the steering amount of the steering 4 by the driver and the steering amount of each of the wheels 3 during automatic steering for various types of control. The steering angle sensor 19 detects a rotation angle of a rotary part of the steering 4. The steering angle sensor 19 is an exemplary angle sensor.

The accelerator sensor 20 is, for example, a sensor that detects the position of a movable part of the acceleration operator 5. The accelerator sensor 20 can detect the position of the accelerator pedal as the movable part of the acceleration operator 5. The accelerator sensor 20 includes a displacement sensor.

The shift sensor 21 is, for example, a sensor that detects the position of a movable part of the transmission operator 7. The shift sensor 21 can detect the position of, for example, a lever, an arm, or a button of the transmission operator 7 as the movable part. The shift sensor 21 may include a displacement sensor or may be formed as a switch.

The wheel speed sensor 22 is a sensor that detects amount of rotation or rotation speed per unit time of each of the wheels 3. The wheel speed sensor 22 outputs as a sensor value a wheel-speed pulse count being the detected rotation speed. The wheel speed sensor 22 may include, for example, a Hall element. The ECU 14 calculates, for example, an amount of movement of the vehicle 1 from the sensor value acquired from the wheel speed sensor 22 for various types of control. The wheel speed sensor 22 may be included in the brake system 18. In this case, the ECU 14 acquires results of the detection by the wheel speed sensor 22 via the brake system 18.

Configurations, arrangement, and electrical connections of the various types of sensors and actuators described above are merely exemplary and may be set (altered) variously.

The following describes configuration of the ranging communicators 16X and the ranging communicators 17X.

The ranging communicators 16X and the ranging communicators 17X have the same configuration, therefore, the following describes the ranging communicator 17X as an example.

Figure 4:
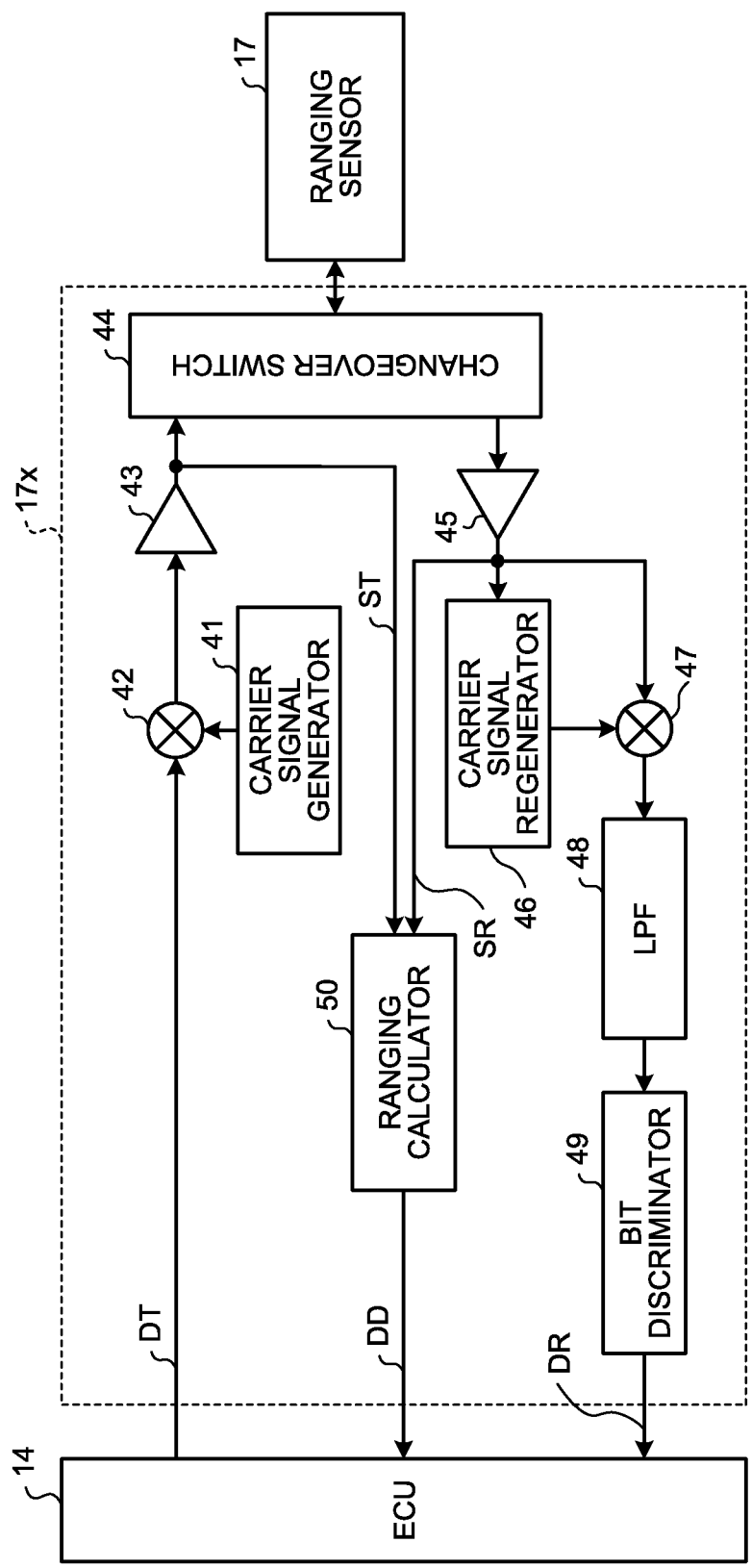
FIG. 4 is a schematic configuration block diagram of a ranging communicator.

FIG. 4 is a schematic configuration block diagram of the ranging communicator.

The ranging communicator 17X includes a carrier signal generator 41, a modulator 42, a transmission amplifier 43, and a changeover switch (SW) 44. The carrier signal generator 41 generates a carrier signal (carrier wave signal) for use in communication. The modulator 42 modulates the carrier signal by a given modulation scheme (e.g., PSK modulation, FSK modulation, and ASK modulation) on the basis of transmission data DT from the ECU 14. The transmission amplifier 43 amplifies an output from the modulator 42 for output. The changeover switch 44 changes over between transmission of a transmission signal ST from the transmission amplifier 43 to the ranging sensors 17 and an output of a reception signal from the ranging sensors 17 to a reception amplifier 45.

The ranging communicator 17X further includes the reception amplifier 45, a carrier signal regenerator 46, a demodulator 47, a low-pass filter (LPF) 48, a bit discriminator 49, and a ranging calculator 50. The reception amplifier 45 amplifies a reception signal from the changeover switch 44 and outputs the resultant as a reception signal SR. The carrier signal regenerator 46 regenerates a carrier signal from the reception signal SR output from the reception amplifier 45 and outputs the resultant carrier signal. The demodulator 47 demodulates the reception signal SR in accordance with the carrier signal output from the carrier signal regenerator 46 and outputs the resultant as a demodulated reception signal. The LPF 48 removes harmonic noise from the demodulated reception signal. The bit discriminator 49 performs bit discrimination of the demodulated reception signal and outputs the resultant as received data DR to the ECU 14. The ranging calculator 50 determines presence or absence of an object such as an obstacle, and calculates a distance to the object from a difference in timing between transmission of the transmission signal ST and reception of the reception signal SR and outputs the resultant as distance data DD to the ECU 14.

The following describes the operation of the present embodiment.

The following describes path guidance in a parking lot as an example.

Figure 5:
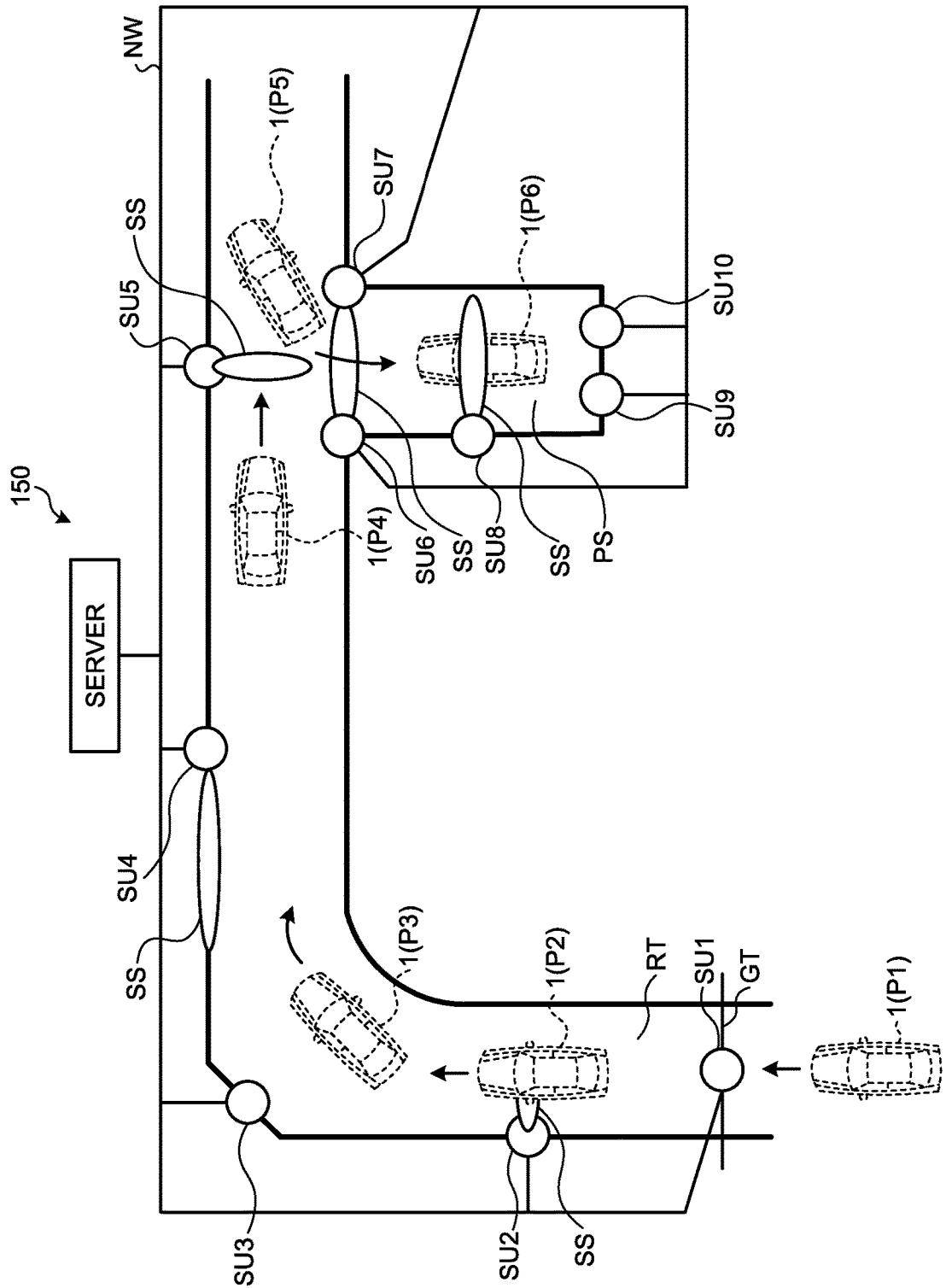
FIG. 5 is a schematic configuration illustrative view of a parking lot system.

FIG. 5 is a schematic illustrative view of the configuration of a parking lot system.

A parking lot system 150 is installed in a given location in a parking lot. The parking lot system 150 includes, for example, a plurality of external sensor units SU1 to SU10 and a server 51. The external sensor units SU1 to SU10 each have the same or similar configuration as the ranging sensors 17 and the ranging communicator 17X illustrated in FIG. 4. The server 51 is communicably connected to the external sensor units SU1 to SU10 via a communication network NW to control the external sensor units SU1 to SU10. The ECU 14 may store map information of the parking lot in advance, for example, and the external sensor units SU1 to SU10 may include their position information. In such a case the parking lot system 150 can provide path guidance to the vehicle without communicating with, for example, the server 51 via the communication network NW.

In the above configuration, the locations of the external sensor units SU1 to SU10 are exemplary. The external sensor unit SU1 is defined to be located at a gate GT of the parking lot and the external sensor unit SU2 is defined to be located in the middle of a vehicle pathway RT within the parking lot. The external sensor unit SU3 is defined to be located at a curve of the vehicle pathway. The external sensor unit SU4 is defined to be located at the boundary of the vehicle pathway RT. The external sensor unit SU5 is defined to be located before a parking space PS to be a destination of path guidance.

The external sensor unit SU6 and the external sensor unit SU7 are defined to be located at both ends of the entrance of the parking space PS. The external sensor unit SU8 is defined to be located in the middle of the parking space PS. The external sensor unit SU9 and the external sensor unit SU10 are defined to be located at both ends of the dead end of the parking space PS.

Herein, the external sensor unit SU6 and the external sensor unit SU7 function as parking line sensors.

The external sensor unit SU8 functions as an in-parking-space sensor.

Furthermore, the external sensor unit SU9 and the external sensor unit SU10 function as parking dead-end sensors.

The following describes a data format of communication data exchanged between the ranging communicators 16X and the ranging communicators 17X, and the external sensor units SU1 to SU10.

Figure 6:
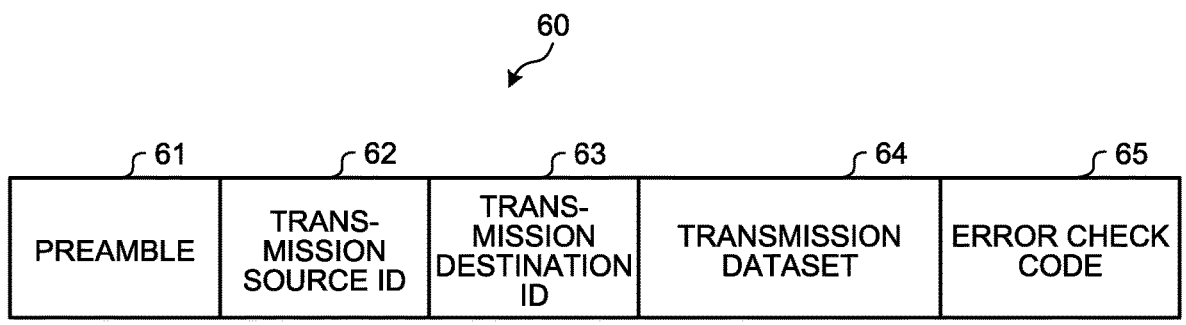
FIG. 6 is an illustrative view of an exemplary data format of communication data.

FIG. 6 is an illustrative view of an exemplary data format of communication data.

Communication data 60 includes preamble data 61, transmission source ID data 62, transmission destination ID data 63, transmission dataset data 64, and error check data 65. The preamble data 61 is for synchronizing communication. The transmission source ID data 62 contains a transmission source ID (transmission source identification information) for identifying a device being the transmission source. The transmission destination ID data 63 stores a transmission destination ID (transmission destination identification information) for identifying a device being a transmission destination. The transmission dataset data 64 includes data required for actual communication such as various types of data (communication control data such as requested data and response data, operation control data, control data for message display). The error check data 65 contains an error check code for checking error in the communication data 60.

In the above configuration, the transmission destination ID data 6362 contains an ID that represents broadcast communication for transmission to a large indefinite number of destinations.

Generally, the external sensor units SU1 to SU10 repeatedly issue communication requests to a large indefinite number of destinations at given timing. Via the ranging communicator 16X or the ranging communicator 17X receiving the communication request, the ECU 14 transmits a communication response to any of the external sensor units SU1 to SU10 having issued the communication request. This starts the communication.

The operation control data in the transmission dataset data 64, transmitted by the external sensor units SU1 to SU10, includes threshold distance information data being distance information necessary for the external sensor units SU1 to SU10 and the ranging sensors 16 and 17 of the vehicle 1 to ensure driving safety of the vehicle 1.

[1] First Embodiment

Referring back to FIG. 5, the operation of the first embodiment is described.

When the vehicle 1 arrives at a position P1 ahead of the gate GT of the parking lot, the ranging sensor 16 or the ranging sensor 17 receives a communication request from the external sensor unit SU1 functioning as a gate sensor, and the ranging communicator 16X or the ranging communicator 17X associated with the ranging sensor 16 or 17 starts communication with the external sensor unit SU1.

Figure 7:
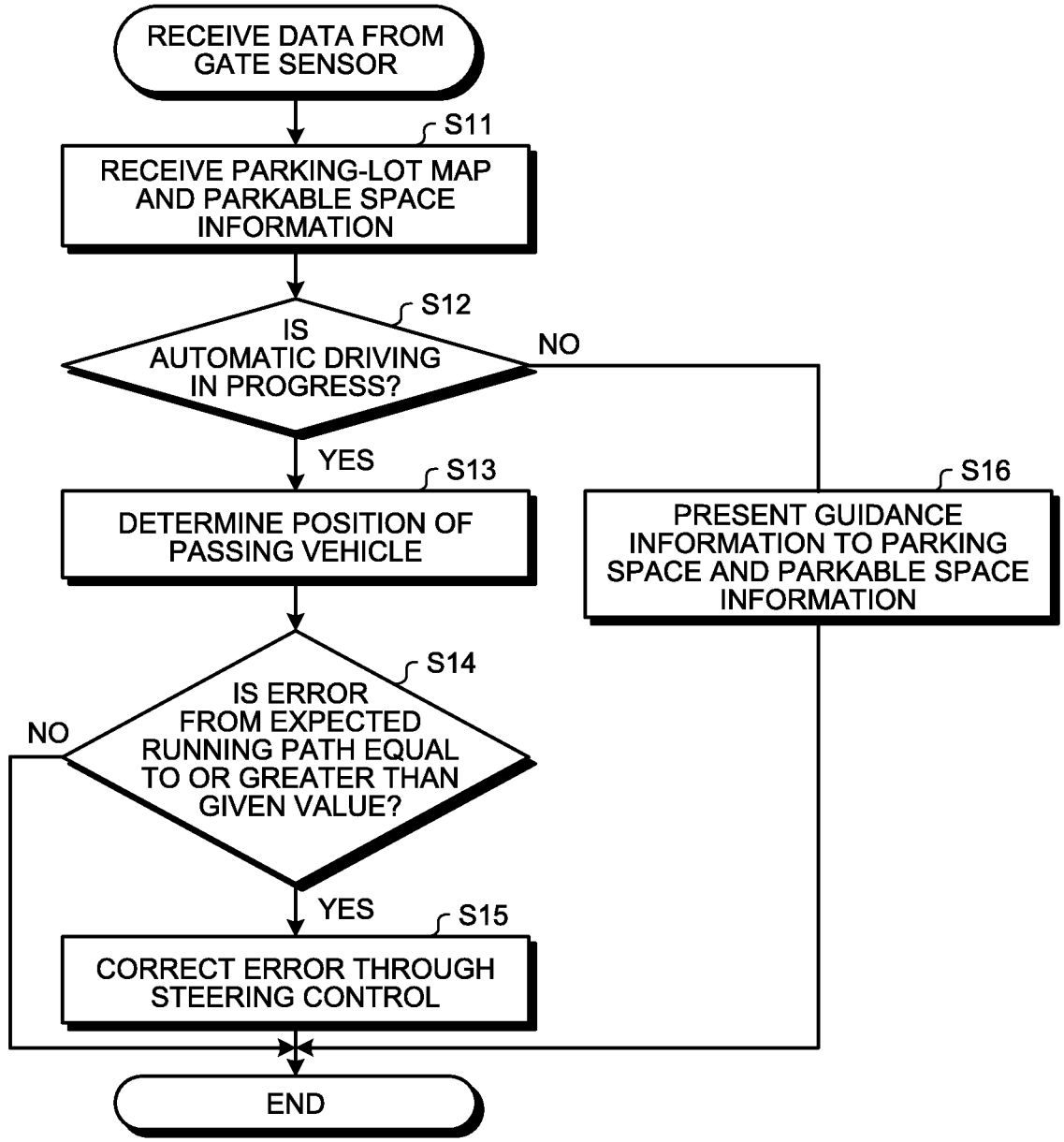
FIG. 7 is a processing flowchart of an ECU in the case of receiving data from an external sensor unit that functions as a gate sensor.

FIG. 7 is a processing flowchart of the ECU when receiving data from an external sensor unit functioning as a gate sensor.

In the following, the ECU 14 executes the same processing irrespective of which one of the ranging communicator 16X and the ranging communicator 17X associated with the ranging sensor 16 or the ranging sensor 17 performs communication.

When the ranging communicator 16X or the ranging communicator 17X associated with any of the ranging sensors 16 or any of the ranging sensors 17 receives data from the external sensor unit SU1 functioning as a gate sensor, the ECU 14 receives a parking-lot map including an expected running path and parkable space information (Step S11).

The ECU 14 then determines whether the vehicle 1 is in automatic driving (Step S12).

After determining at Step S12 that the vehicle 1 is not in automatic driving (No at Step S12), the ECU 14 presents guidance information to the parking space and information on the parkable space PS (Step S16), ending the processing.

After determining at Step S12 that the vehicle 1 is in automatic driving (Yes at Step S12), the ECU 14 calculates and determines the position of the passing vehicle 1 from the distance between the external sensor unit SU1 and the ranging sensor 16 or 17 located communicably with the external sensor unit SU1 (Step S13).

The ECU 14 determines whether an error in position of the vehicle 1 with respect to the expected running path is equal to or greater than a given value (Step S14).

After determining at Step S14 that the position error of the vehicle 1 with respect to the expected running path is equal to or greater than the given value, the ECU 14 drives the actuator 13a via the steering system 13 to correct the error so that the vehicle 1 actually runs on the path close to the expected running path, ending the processing (Step S15).

After determining at Step S14 that the position error of the vehicle 1 with respect to the expected running path is smaller than the given value (No at Step S14), the vehicle can continuously run as it currently is, thus, the ECU 14 ends the processing.

Figure 8:
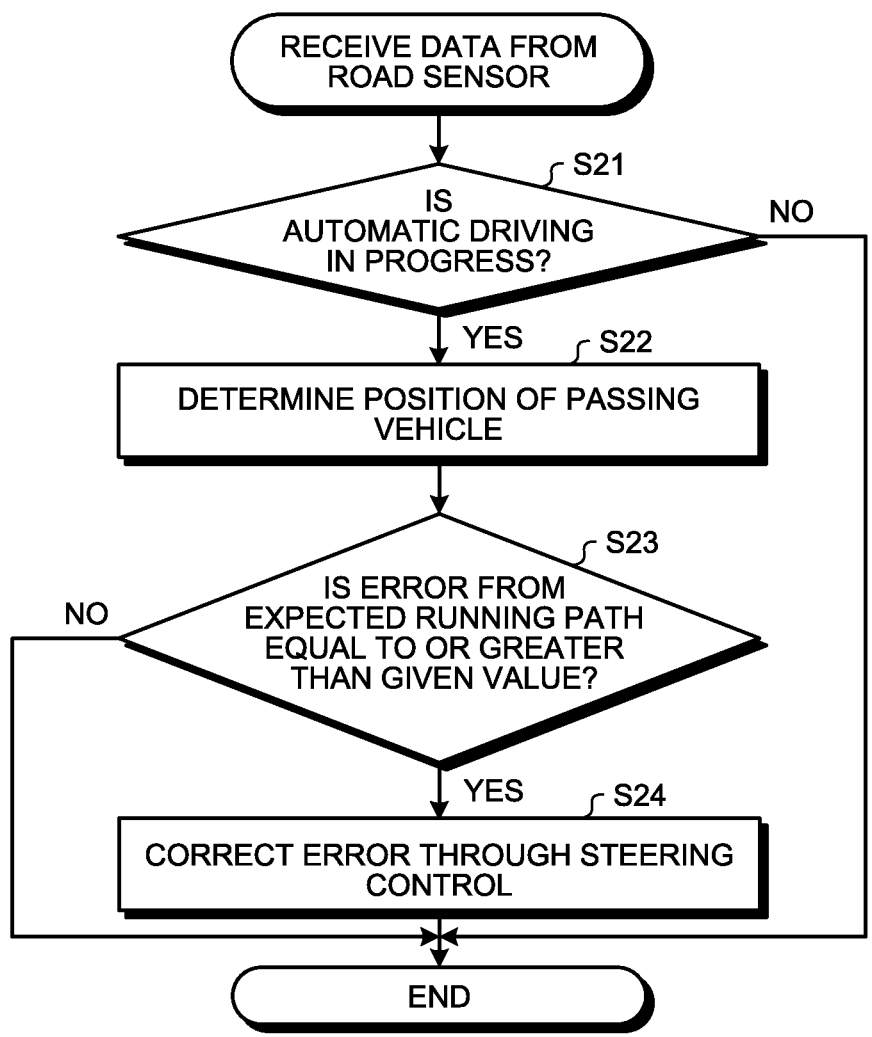
FIG. 8 is a processing flowchart of the ECU in the case of receiving data from an external sensor unit that functions as a road sensor.

FIG. 8 is a processing flowchart of the ECU when receiving data from an external sensor unit that functions as a road sensor.

When the vehicle then reaches a position P2 in the parking lot and the ranging communicator 16X or the ranging communicator 17X associated with any of the ranging sensors 16 or any of the ranging sensors 17 receives data from the external sensor unit SU2 functioning as a road sensor, the ECU 14 determines whether the vehicle 1 is in automatic driving (Step S21).

After determining at Step S21 that the vehicle 1 is not in automatic driving (No at Step S21), the ECU 14 ends the processing.

After determining at Step S21 that the vehicle 1 is in automatic driving (Yes at Step S21), the ECU 14 calculates and determines the position of the passing vehicle 1 from the distance between the external sensor unit SU2 and the ranging sensor 16 or 17 located communicably with the external sensor unit SU2 (Step S22).

The ECU 14 determines whether the position error of the vehicle 1 with respect to the expected running path (expected running position) is equal to or greater than a given value (=allowable position error) (Step S23).

After determining at Step S23 that the position error of the vehicle 1 with respect to the expected running path is equal to or greater than the given value, the ECU 14 drives the actuator 13a via the steering system 13 to correct the error so that the vehicle 1 actually runs on the path close to the expected running path, ending the processing (Step S24).

After determining at Step S23 that the position error of the vehicle 1 with respect to the expected running path is smaller than the given value (No at Step S23), the vehicle 1 can continue running as it currently is, so that ECU 14 ends the processing.

Figure 9:
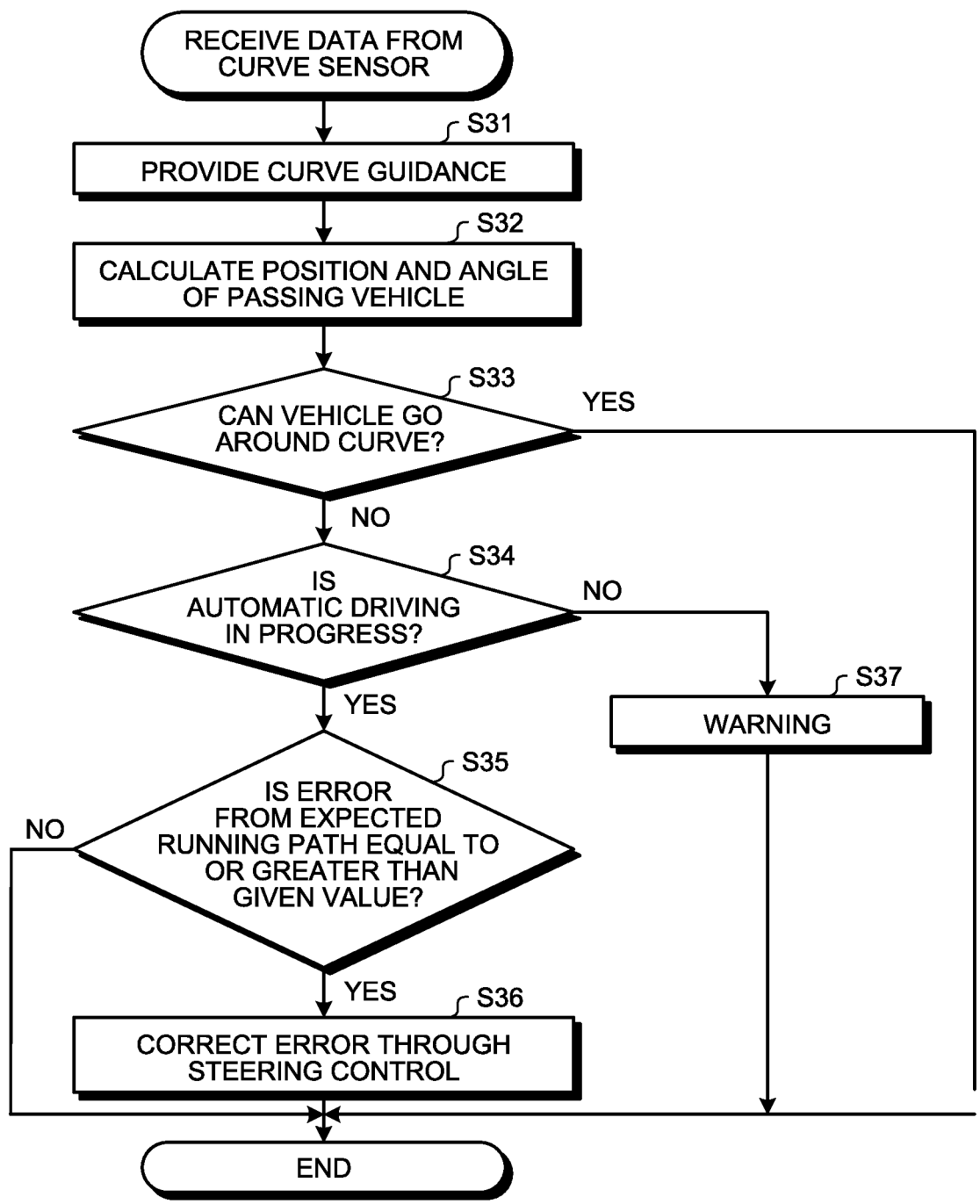
FIG. 9 is a processing flowchart of the ECU in the case of receiving data from an external sensor unit that functions as a curve sensor.

FIG. 9 is a processing flowchart of the ECU when receiving data from an external sensor unit functioning as a curve sensor.

When the vehicle 1 arrives at a position P3 in the parking lot and the ranging communicator 16X or the ranging communicator 17X associated with any of the ranging sensors 16 or any of the ranging sensors 17 receives data from the external sensor unit SU3 functioning as a curve sensor, the ECU 14 receives curve guidance information indicating that the vehicle 1 is approaching a curve on the running path (Step S31).

The ECU 14 then calculates, from the distance between the external sensor unit SU3 and the ranging sensor 16 or 17 located communicably with the external sensor unit SU3, the position and the angle of the passing vehicle 1 (Step S32).

The ECU 14 then determines whether the vehicle 1 can go around (successfully corners) the curve, from the position and the angle of the passing vehicle 1, considering the speed based on the output from the wheel speed sensor 22 and the steering amount of the steering 4 based on the output from the steering angle sensor 19 (Step S33).

After determining at Step S33 that the vehicle 1 can go around (successfully corners) the curve (Yes at Step S33), the vehicle 1 can continue running as it currently is, so that ECU 14 ends the processing.

After determining at Step S33 that the vehicle 1 cannot go around (fails in cornering) the curve (No at Step S33), the ECU 14 determines whether the vehicle 1 is in automatic driving (Step S34).

After determining at Step S34 that the vehicle 1 is not in automatic driving (No at Step S34), the ECU 14 presents alarm information that the vehicle 1 may be unable to go around (fail in cornering) (Step S37), ending the processing.

After determining at Step S34 that the vehicle 1 is in automatic driving (Yes at Step S34), the ECU 14 determines whether the position error of the vehicle 1 with respect to the expected running path is equal to or greater than the given value (=allowable position error) (Step S35).

After determining at Step S35 that the position error of the vehicle 1 with respect to the expected running path is equal to or greater than the given value, the ECU 14 drives the actuator 13a via the steering system 13 to correct the error so that the vehicle 1 actually runs on the path close to the expected running path and more stably corners, ending the processing (Step S36).

After determining at Step S35 that the position error of the vehicle 1 with respect to the expected running path is smaller than the given value (No at Step S35), the vehicle 1 can continue driving as it currently is, so that ECU 14 ends the processing.

Figure 10:
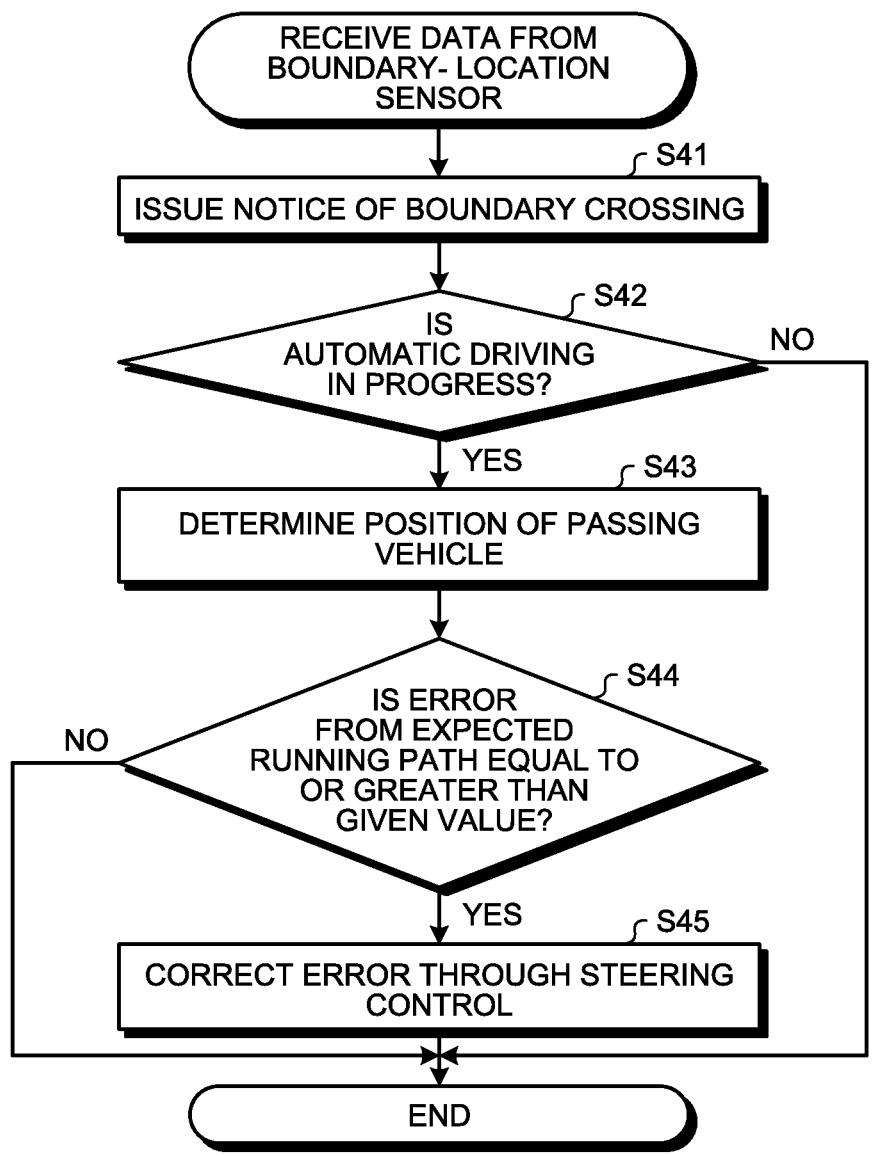
FIG. 10 is a processing flowchart of the ECU in the case of receiving data from an external sensor unit that functions as a boundary-location sensor.

FIG. 10 is a processing flowchart of the ECU when receiving data from an external sensor unit that functions as a boundary-location sensor.

When the ranging communicator 16X or the ranging communicator 17X associated with any of the ranging sensors 16 or any of the ranging sensors 17 receives data from the external sensor unit SU4 functioning as a boundary-location sensor with a high ultrasonic directivity (beam directivity) that emits ultrasonic waves along a boundary, the ECU 14 receives boundary information representing that the vehicle 1 has arrived at a point at which the vehicle 1 can no longer continue to run (e.g., an entry point to a driving prohibited road and a spot in which a wall, with which the vehicle 1 may collide, stands) (Step S41).

Thus, the ECU 14 issues a notice by voice through the audio output device 9 or through the display device 8 or the display device 12.

Next, the ECU 14 determines whether the vehicle 1 is in automatic driving (Step S42).

After determining at Step S42 that the vehicle 1 is not in automatic driving (No at Step S42), the ECU 14 ends the processing.

After determining at Step S42 that the vehicle 1 is in automatic driving (Yes at Step S42), the ECU 14 calculates and determines the position of the passing vehicle 1 from the distance between the external sensor unit SU4 and the ranging sensor 16 or 17 located communicably with the external sensor unit SU4 (Step S43).

The ECU 14 then determines whether a position error of the vehicle 1 with respect to the expected running path is equal to or greater than a given value (Step S44).

After determining at Step S44 that the position error of the vehicle 1 with respect to the expected running path is equal to or greater than the given value, the ECU 14 drives the actuator 13a via the steering system 13 to correct the error so that the vehicle 1 actually runs on the path close to the expected running path, ending the processing (Step S45).

After determining at Step S44 that the position error of the vehicle 1 with respect to the expected running path is smaller than the given value (No at Step S44), the vehicle 1 can continue running as it currently is, so that ECU 14 ends the processing.

Figure 11:
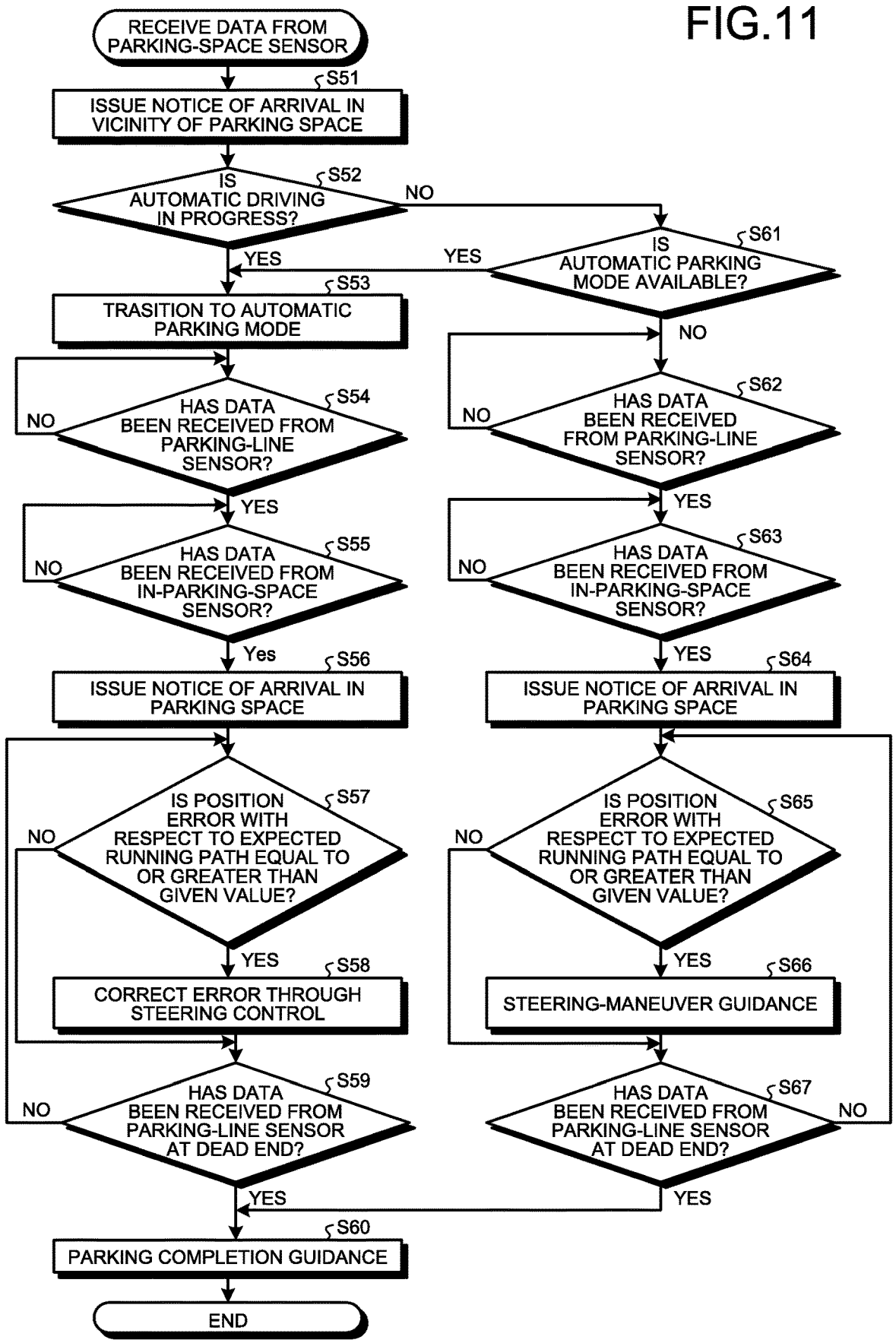
FIG. 11 is a processing flowchart of the ECU in the case of receiving data from an external sensor unit that functions as a parking space sensor.

FIG. 11 is a processing flowchart of the ECU when receiving data from an external sensor unit functioning as a parking-space sensor.

After the vehicle 1 passes a position P4 in the parking lot, when the ranging communicator 16X or the ranging communicator 17X associated with any of the ranging sensors 16 or any of the ranging sensors 17 receives data from the external sensor unit SU5 functioning as a parking-space sensor that issues a notice that the vehicle 1 has arrived at a location near an assigned parkable space PS, the ECU 14 receives parking-space approaching information representing the arrival of the vehicle 1 in the vicinity of the assigned parkable space PS (Step S51).

Thus, the ECU 14 issues notification by voice via the audio output device 9 or via the display device 8 or the display device 12 that the vehicle 1 has arrived in the vicinity of the assigned parkable space PS.

Next, the ECU 14 determines whether the vehicle 1 is in automatic driving (Step S52).

After determining at Step S52 that the vehicle 1 is in automatic driving (Yes at Step S52), the ECU 14 makes a transition of the operation mode of the vehicle 1 to an automatic parking mode (Step S53).

The ECU 14 then controls the steering system 13 and the brake system 18 to automatically move the vehicle 1 into the parking space PS via a position P5 in the parking lot, transitions to the automatic parking mode for moving to the parking position, and performs automatic parking control.

The ECU 14 next determines whether to have received data from the external sensor unit SU6 and the external sensor unit SU7 functioning as parking line sensors, specifically, whether the vehicle 1 has reached the parking space PS (Step S54).

After determining no receipt of the data from the external sensor unit SU6 and the external sensor unit SU7 functioning as the parking line sensors at Step S54 (No at Step S54), the ECU 14 is set in a standby state.

After determining receipt of the data from the external sensor unit SU6 and the external sensor unit SU7 functioning as the parking line sensors at Step S54 (Yes at Step S54), the ECU 14 determines whether to have received data from the external sensor unit SU8 functioning as the in-parking-space sensor, specifically, whether the vehicle 1 has arrived inside the parking space PS (Step S55).

After determining no receipt of the data from the external sensor unit SU8 as the in-parking-space sensor at Step S55 (No at Step S55), the ECU 14 is set in a standby state.

After determining receipt of the data from the external sensor unit SU8 as the in-parking-space sensor at Step S55 (Yes at Step S55), the ECU 14 issues a guidance by voice or a notification via the display device 8 or the display device 12 that the vehicle 1 has arrived inside the parking space PS (Step S56).

The ECU 14 then calculates, from the distance between the external sensor unit SU8 and the ranging sensor 16 or 17 located communicably with the external sensor unit SU8, the position P6 of the passing vehicle 1 and determines whether the position error of the vehicle 1 with respect to the expected running path is equal to or greater than a given value (=allowable position error) (Step S57).

After determining at Step S57 that the position error of the vehicle 1 with respect to the expected running path is smaller than the given value, the ECU 14 determines that the vehicle 1 can continue running as it currently is and proceeds to Step S59.

After determining at Step S57 that the position error of the vehicle 1 with respect to the expected running path is equal to or greater than the given value, the ECU 14 drives the actuator 13a via the steering system 13 to correct the error so that the vehicle 1 actually runs on the path close to the expected running path, ending the processing (Step S58).

The ECU 14 next determines whether to have received data from the external sensor unit SU9 and the external sensor unit SU10 functioning as parking dead-end sensors, specifically, whether the vehicle 1 has reached the parking position at the dead end of the parking space PS (Step S59).

After determining no receipt of the data from the external sensor unit SU9 and the external sensor unit SU10 functioning as the parking dead-end sensors at Step S59 (No at Step S59), the ECU 14 determines non-completion of the parking and returns to Step S57 and repeats the same operation as above to continue the automatic parking control.

After determining receipt of the data from the external sensor unit SU9 and the external sensor unit SU10 functioning as the parking dead-end sensors at Step S59 (Yes at Step S59), the ECU 14 issues a voice guidance or a notification via the display device 8 or the display device 12 that the vehicle 1 has reached the parking position at the dead end of the parking space PS, and places the vehicle 1 in a parking state, ending the processing (Step S60).

Meanwhile, after determining at Step S52 that the vehicle 1 is not in automatic driving (No at Step S52), the ECU 14 determines whether the vehicle 1 includes the automatic parking mode as an operation mode (Step S61).

After determining at Step S61 that the vehicle 1 includes the automatic parking mode as an operation mode (Yes at Step S61), the ECU 14 returns to Step S53, repeats the same operation in the automatic driving as above, and places the vehicle 1 in the parking state, ending the processing (Step S53 to Step S60).

After determining at Step S61 that the vehicle 1 includes no automatic parking mode as an operation mode (No at Step S61), the ECU 14 determines whether to have received data from the external sensor unit SU6 and the external sensor unit SU7 functioning as the parking line sensors, specifically, whether the vehicle 1 has reached the parking space PS (Step S62).

After determining no receipt of the data from the external sensor unit SU6 and the external sensor unit SU7 functioning as the parking line sensors at Step S62 (No at Step S62), the ECU 14 enters a standby state.

After determining receipt of data from the external sensor unit SU6 and the external sensor unit SU7 functioning as the parking line sensors at Step S62 (Yes at Step S62), the ECU 14 determines whether to have received data from the external sensor unit SU8 functioning as the in-parking-space sensor, specifically, whether the vehicle 1 has arrived inside the parking space PS (Step S63).

After determining no receipt of the data from the external sensor unit SU8 functioning as the in-parking-space sensor at Step S63 (No at Step S63), the ECU 14 enters a standby state.

After determining receipt of the data from the external sensor unit SU8 functioning as the in-parking-space sensor at Step S63 (Yes at Step S63), the ECU 14 issues a voice guidance or a notification via the display device 8 or the display device 12 that the vehicle 1 has arrived inside the parking space PS (Step S64).

The ECU 14 then calculates, from the distance between the external sensor unit SU8 and the ranging sensor 16 or 17 located communicably with the external sensor unit SU8, the position of the passing vehicle 1 and determines whether the position error of the vehicle 1 with respect to the expected running path is equal to or greater than a given value (Step S65).

After determining at Step S65 that the position error of the vehicle 1 with respect to the expected running path is smaller than the given value (No at Step S65), the ECU 14 determines that the vehicle 1 can continue running as it currently is, and proceeds to Step S67.

After determining at Step S65 that the position error of the vehicle 1 with respect to the expected running path is equal to or greater than the given value (Yes at Step S65), the ECU 14 notifies the driver of how to maneuver the steering by voice or via the display device 8 or the display device 12 so that the driver can actually drive the vehicle 1 on the path close to the expected running path (Step S66).

The ECU 14 next determines whether to have received data from the external sensor unit SU9 and the external sensor unit SU10 functioning as the parking dead-end sensors, specifically, whether the vehicle 1 has reached the parking position at the dead end of the parking space PS (Step S67).

After determining no receipt of the data from the external sensor unit SU9 and the external sensor unit SU10 functioning as the parking dead-end sensors at Step S67 (No at Step S67), the ECU 14 determines non-completion of the parking, and returns to Step S65 and repeats the same operation as above to continue the automatic parking control.

After determining receipt of the data from the external sensor unit SU9 and the external sensor unit SU10 functioning as the parking dead-end sensors at Step S67 (Yes at Step S67), the ECU 14 issues a voice guidance or a notification via the display device 8 or the display device 12 that the vehicle 1 has reached the parking position at the dead end of the parking space PS, ending the processing.

As described above, as long as the vehicle 1 is automatically drivable, the first embodiment enables automatic driving of the vehicle 1 to a parking space for parking, even to a new parking space, through simple data communication with the external sensor units SU1 to SU10, which eliminates the need for the driver to look around for a parking space. This can greatly reduce driver's time and effort.

Irrespective of whether the vehicle 1 is automatically parkable or includes automatic driving or automatic parking function, the first embodiment can efficiently provide guidance to the parking space, thereby reducing a driver's load.

Thus, the first embodiment is effective in a parking lot where the driver cannot find a parkable space at first view, particularly in a multistory parking lot with poor visibility or in a plane parking lot in the suburbs too large to view the entire area.

[1.1] Modification of the First Embodiment

Figure 12:
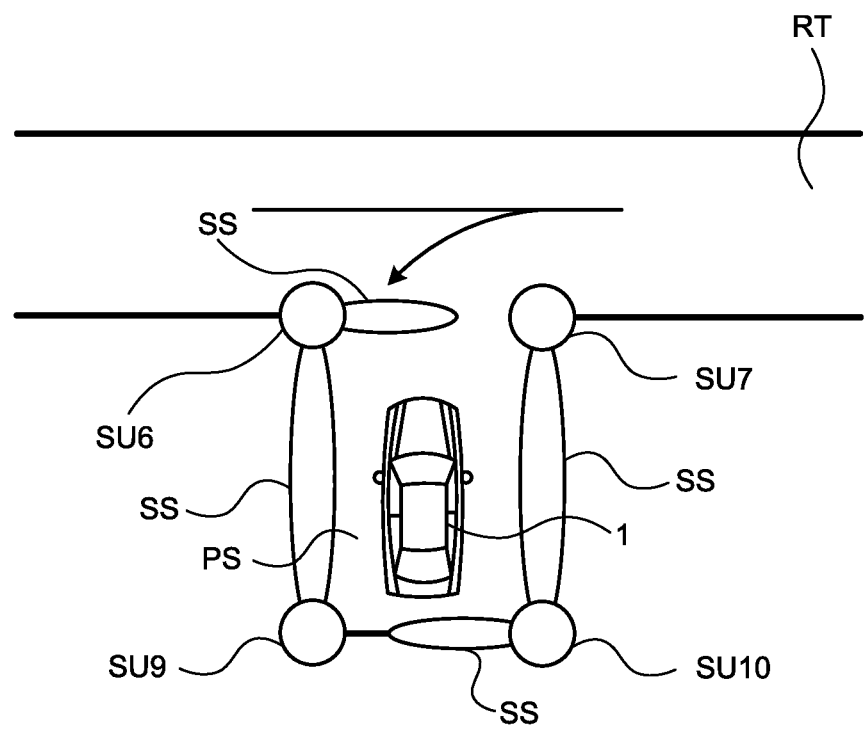
FIG. 12 is a diagram illustrating a modification of the first embodiment.

FIG. 12 is a diagram illustrating a modification of the first embodiment.

The first embodiment has described the external sensor units installed in the parking space PS, including the external sensor units SU6 and SU7 functioning as the parking line sensors, the external sensor unit SU8 functioning as the in-parking-space sensor, and the external sensor units SU9 and SU10 functioning as the parking dead-end sensors. As illustrated in FIG. 12, the external sensor units may include four external sensor units SU6, SU7, SU9, and SU10 functioning as the boundary-location sensors having the same or similar directivity as the external sensor unit SU4, described in the first embodiment.

In this case, the external sensor unit SU6 function as the external sensor units SU6 and SU7 functioning as the parking line sensors in the first embodiment, the external sensor units SU7 and SU9 function as the external sensor unit SU8 functioning as the in-parking-space sensor in the first embodiment, and the external sensor unit SU10 functions as the external sensor unit SU9 and the external sensor unit SU10 functioning as the parking dead-end sensors in the first embodiment.

Such a configuration enables decrease in the number of external sensor units installed in the parking space and common use of the in-parking-space sensor in the adjacent parking spaces (e.g., in the neighboring parking space on the right side, the external sensor unit SU7 is commonly usable as the in-parking-space sensor between the two parking spaces). This can further reduce installation cost.

[2] Second Embodiment

The following describes a second embodiment.

The second embodiment differs from the first embodiment in operation after the vehicle arrives in the vicinity of the parking space PS.

Figure 13:
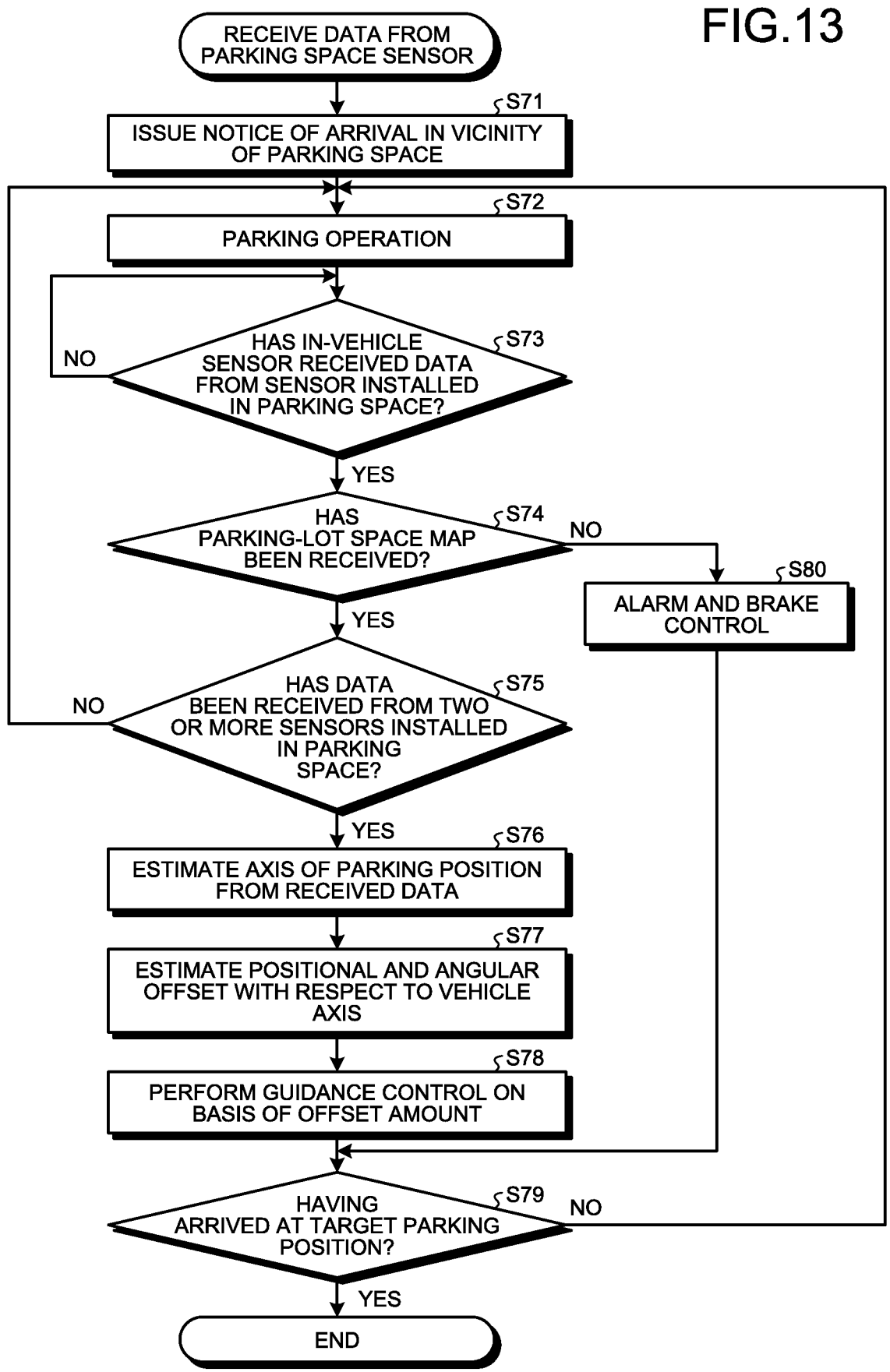
FIG. 13 is a processing flowchart of an ECU in a second embodiment in the case of receiving data from an external sensor unit that functions as a parking space sensor.

FIG. 13 is a processing flowchart of the ECU in the second embodiment when receiving data from an external sensor unit that functions as a parking space sensor.

Figure 14:
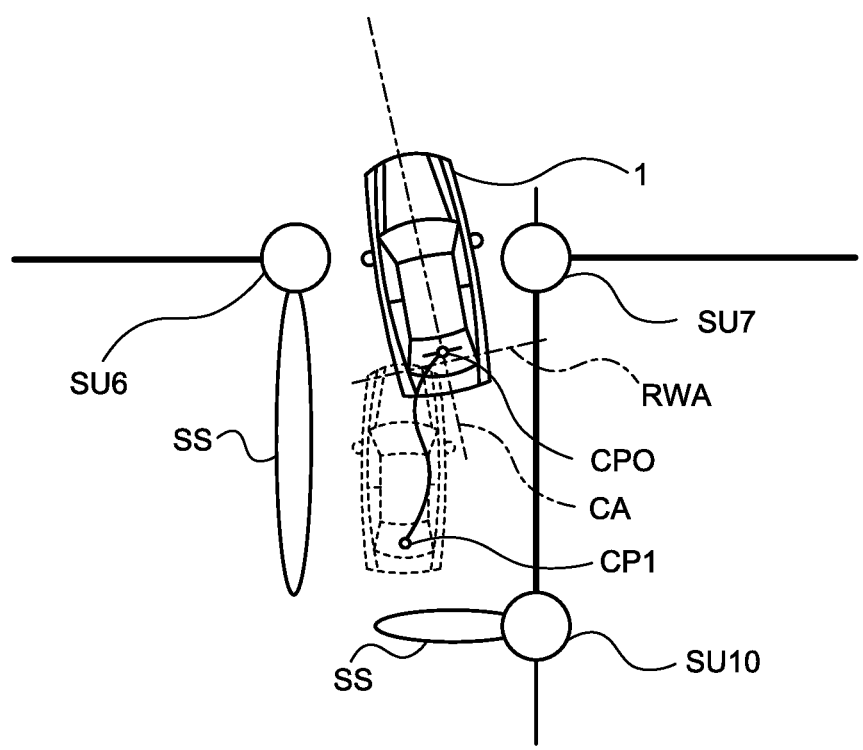
FIG. 14 is an explanatory diagram of the operation in the second embodiment.

FIG. 14 is a diagram illustrating the operation in the second embodiment.

When the ranging communicator 16X or the ranging communicator 17X associated with any of the ranging sensors 16 or any of the ranging sensors 17 receives data from the external sensor unit SU5 functioning as the parking space sensor that issues notification that the vehicle 1 has arrived in the vicinity of the assigned parkable space PS, the ECU 14 receives parking space PS approaching information that the vehicle 1 has arrived in the vicinity of the assigned parkable space PS. The ECU 14 issues a notification by voice through the audio output device 9 or through the display device 8 or the display device 12 that the vehicle 1 has arrived in the vicinity of the assigned parkable space PS (Step S71).

As a result, the ECU 14 of the vehicle 1 proceeds to a parking operation (Step S72) and determines whether to have received data from any of the external sensor unit SU6, the external sensor unit SU7, and the external sensor unit SU10 installed in the parking space PS (Step S73).

After determining no receipt of the data from any of the external sensor unit SU6, the external sensor unit SU7, and the external sensor unit SU10 installed in the parking space PS at Step S73 (No at Step S73), the ECU 14 enters a standby state.

After determining receipt of the data from any of the external sensor unit SU6, the external sensor unit SU7, and the external sensor unit SU10 installed in the parking space PS at Step S73 (Yes at Step S73), the ECU 14 determines whether to have received a parking space map representing the locations of the external sensor unit SU6, the external sensor unit SU7, and the external sensor unit SU10 in the parking space PS (Step S74).

After determining receipt of the parking space map at Step S74 (Yes at Step S), the ECU 14 determines whether to have received data from two or more of the external sensor unit SU6, the external sensor unit SU7, and the external sensor unit SU10 in the parking space PS (Step S75). After determining no receipt of the parking space map at Step S74 (No at Step S74), the ECU 14 issues an alarm, controls the brake system 18 to perform braking control over the vehicle 1 to temporarily stop, and prompts the driver to drive the vehicle to the parking space PS by himself or herself (Step S80), and proceeds to Step S79.

After determining no receipt of the data from two or more external sensor units at Step S75 (No at Step S75), the ECU 14 returns to Step S72 and repeats the same operation as above in order to continue the operation.

After determining receipt of the data from two or more external sensor units at Step S75 (Yes at Step S75), the ECU 14 is now able to calculate the posture of the vehicle 1 on the basis of the received data from the external sensor units (information on the distance to each of the external sensor units). Thus, the ECU 14 estimates the position of the axis of a parking position (position of the axis of an optimum parking position in the parking space PS) on the basis of the received data (Step S76).

Herein, in FIG. 14, the position of the axis of the parking position is defined to be a lengthwise axis CA of the vehicle 1 parked in the optimum parking position (indicated by the broken line in the FIG. 14).

The ECU 14 next estimates a positional offset and an angular offset between the position of the lengthwise axis CA of the vehicle 1 parked in the optimum parking position (indicated by the broken line in the FIG. 14) and the actual position of the axis CA of the vehicle 1 (indicated by the solid line in FIG. 14) (Step S77).

Thereby, the ECU 14 performs guidance control over the vehicle 1 (e.g., automatic parking control or steering maneuver guidance) on the basis of the positional offset amount and the angular offset amount (Step S78).

The ECU 14 then determines whether the vehicle 1 has arrived in a target parking position that corresponds to the estimated position of the axis of the parking position at Step S76 and is at the rear end of the parking position (in the example illustrated in FIG. 14, the position at which the ranging sensors 16 and 17, which are installed on the rear side of the vehicle 1, can receive directional ultrasonic waves SS from the external sensor unit SU10) (Step S79).

In this case, the target parking position may be set to the position at which an axis RWA of the rear wheel of the vehicle 1 reaches a given position, or to a given position CP0 of the vehicle 1 falling within a given range from a target position CP1.

After determining at Step S79 that the vehicle 1 has not reached the target parking position (No at Step S79), the ECU 14 returns to Step S72 again and repeats the same operation as above.

After determining at Step S79 that the vehicle 1 has not reached the target parking position, the ECU 14 ends the processing.

As described above, the second embodiment can attain similar or same effects as the first embodiment, and determines, for the control, whether the given target parking position of the vehicle 1 is located at the axis of the parking position, on the basis of the axis CA of the vehicle 1 and the axis RWA of the rear wheel of the vehicle 1 or on the basis of the given position CP0 of the vehicle 1.

[3] Modifications of the Embodiments

While certain embodiments have been described, these embodiments have been presented by way of example only, and are not intended to limit the scope of the invention. Indeed, the novel embodiments described herein may be embodied in a variety of other forms; furthermore, various omissions, substitutions, and changes in the form of the embodiments described herein may be made without departing from the spirit of the invention. The accompanying claims and their equivalents are intended to cover such forms or modifications as would fall within the scope and spirits of the invention.

For example, while the above embodiments have described the example of one parking space PS presented, it is possible to notify the vehicle 1 of information on two or more parking spaces PS at the time of passing the gate, allowing the driver to choose any of the available parking spaces.

The invention claimed is:

1. A vehicle guidance device to be installed in a vehicle for providing path guidance to the vehicle, the device comprising:
   a plurality of receivers that receives a ranging information signal via a ultrasonic-wave ranging sensor, the ranging information signal including an ultrasonic-wave ranging signal on which path guidance information for guiding the vehicle to a location is superimposed, the ultrasonic-wave ranging signal being for measuring a distance to an object;
   an information extractor that extracts, for each of the receivers, the path guidance information from the ranging information signal; and
   a path guide that provides the path guidance on the basis of a distance corresponding to the ultrasonic-wave ranging signal and the path guidance information.

2. The vehicle guidance device according to claim 1, wherein
   the path guidance information includes identification information for identifying a transmitter that has transmitted the ranging information signal, and
   the path guide calculates a position and an orientation of the vehicle from the identification information and location information of the receivers, to provide the path guidance.

3. The vehicle guidance device according to claim 2, wherein
the path guide acquires and stores, in advance, location information of the transmitter associated with the identification information to provide the path guidance on the basis of the location information of the transmitter.

4. The vehicle guidance device according to claim 3, wherein
upon entry of the vehicle into in a region in which the path guidance is provided, one or more of the receivers receive the location information of the transmitter as the ranging information signal from the transmitter located in the region.

5. The vehicle guidance device according to claim 1, wherein
the path guidance information includes expected running-path information of the vehicle, and
the path guide comprises an information presenter that presents, on the basis of the expected running-path information, a driver with information for guiding the vehicle along an expected running path corresponding to the expected running path information.

6. The vehicle guidance device according to claim 5, wherein the path guide comprises a steering control that:
calculates a difference between the expected running path and an actual running path of the vehicle, and
when the difference between the expected running path and the actual running path is equal to or greater than a given value, controls a steering angle of a wheel of the vehicle to decrease the difference to below the given value.

7. The vehicle guidance device according to claim 5, wherein
the path guide comprises a steering information presenter that:
calculates a difference between the expected running path and an actual running path of the vehicle, and
when the difference between the expected running path and the actual running path is equal to or greater than a given value, provides steering information of the vehicle to decrease the difference to below the given value.

8. The vehicle guidance device according to claim 5, wherein
the path guidance information includes guiding information to a parking space and information on a parking-end position,
the vehicle comprises, as an operation mode, an automatic parking mode to perform automatic parking, and
upon detection of the vehicle having reached a vicinity of the parking space, the path guide transitions to the automatic parking mode to control the vehicle to reach the parking-end position in accordance with the path guidance information.

9. A vehicle guidance method to be executed by a vehicle guidance device installed in a vehicle, the vehicle guidance device that provides path guidance to the vehicle, the vehicle guidance method comprising:
receiving, by a plurality of receivers, a ranging information signal via a ultrasonic-wave ranging sensor, the ranging information signal including an ultrasonic-wave ranging signal on which path guidance information is superimposed, the ultrasonic-wave ranging signal being for measuring a distance to an object;
extracting, for each of the receivers, the path guidance information from the ranging information signal; and
providing the path guidance on the basis of a distance corresponding to the ultrasonic-wave ranging signal and the path guidance information.

10. A computer program product including programmed instructions embodied in and stored on a non-transitory computer readable medium, wherein the instructions, when executed by a computer, cause a computer to control a vehicle guidance device installed in a vehicle, the device that comprises a plurality of receivers, and provides path guidance to the vehicle, the receivers that receive a ranging information signal via a ultrasonic-wave ranging sensor, the ranging information signal including an ultrasonic-wave ranging signal on which path guidance information for guiding the vehicle to a location is superimposed, the ultrasonic-wave ranging signal being for measuring a distance to an object, the instructions causing the computer to perform:
extracting, for each of the receivers, the path guidance information from the ranging information signal; and
providing the path guidance on the basis of a distance corresponding to the ultrasonic-wave ranging signal and the path guidance information.

* * * * *